United States Patent
Beard et al.

(10) Patent No.: US 7,194,520 B1
(45) Date of Patent: Mar. 20, 2007

(54) CONTENT PLAYER FOR BROADCASTING TO INFORMATION APPLIANCES

(75) Inventors: Paul Beard, Milpitas, CA (US); Enrique Alfaro, Palo Alto, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 776 days.

(21) Appl. No.: 09/792,388

(22) Filed: Feb. 23, 2001

Related U.S. Application Data

(60) Provisional application No. 60/184,848, filed on Feb. 25, 2000.

(51) Int. Cl.
 G06F 15/16 (2006.01)
(52) U.S. Cl. ............ 709/217; 709/203; 709/231; 709/238; 370/352
(58) Field of Classification Search ......... 709/217, 709/218–219, 203, 231, 238, 246; 370/338, 370/352, 401; 455/432.1
See application file for complete search history.

(56) References Cited

U.S. PATENT DOCUMENTS

| | | | | |
|---|---|---|---|---|
| 5,459,760 A | * | 10/1995 | Watanabe | 375/134 |
| 5,796,394 A | * | 8/1998 | Wicks et al. | 709/206 |
| 5,956,331 A | * | 9/1999 | Rautiola et al. | 370/338 |
| 6,065,120 A | * | 5/2000 | Laursen et al. | 709/227 |
| 6,243,739 B1 | * | 6/2001 | Schwartz et al. | 709/219 |
| 6,249,810 B1 | * | 6/2001 | Kiraly | 709/217 |
| 6,298,234 B1 | * | 10/2001 | Brunner | 455/432.1 |
| 6,314,094 B1 | * | 11/2001 | Boys | 370/352 |
| 6,317,784 B1 | * | 11/2001 | Mackintosh et al. | 709/219 |
| 6,349,329 B1 | * | 2/2002 | Mackintosh et al. | 709/219 |
| 6,389,463 B2 | * | 5/2002 | Bolas et al. | 709/219 |
| 6,430,624 B1 | * | 8/2002 | Jamtgaard et al. | 709/217 |
| 6,473,609 B1 | * | 10/2002 | Schwartz et al. | 455/406 |
| 6,519,460 B1 | * | 2/2003 | Haartsen | 455/452.1 |
| 6,526,581 B1 | * | 2/2003 | Edson | 725/74 |
| 6,546,427 B1 | * | 4/2003 | Ehrlich et al. | 709/231 |
| 6,581,103 B1 | * | 6/2003 | Dengler | 709/219 |
| 6,597,891 B2 | * | 7/2003 | Tantawy et al. | 455/3.05 |
| 6,628,928 B1 | * | 9/2003 | Crosby et al. | 455/77 |
| 6,637,027 B1 | * | 10/2003 | Breslauer et al. | 725/25 |
| 6,654,367 B1 | * | 11/2003 | Kaufman | 370/356 |
| 6,684,240 B1 | * | 1/2004 | Goddard | 709/217 |
| 6,701,355 B1 | * | 3/2004 | Brandt et al. | 709/219 |
| 6,834,308 B1 | * | 12/2004 | Ikezoye et al. | 709/217 |
| 2002/0059163 A1 | * | 5/2002 | Smith | 707/1 |

* cited by examiner

*Primary Examiner*—Philip B. Tran
(74) *Attorney, Agent, or Firm*—Marger Johnson & McCollom P.C.

(57) ABSTRACT

The present invention is directed to a content player that allows a user to access media content through an information appliance. The content player is suitable for receiving media content from a network, then the media content may be transmitted to various information appliances. The information appliance is suitable for receiving the media content from the content player and conveying the media content. The information appliance, itself, may be capable of controlling the media content transmitted from the content player and received by the information appliance.

11 Claims, 4 Drawing Sheets

CONTENT PLAYER FOR BROADCASTING TO INFORMATION APPLIANCES

CROSS REFERENCE TO RELATED APPLICATION

The present application claims priority to U.S. Provisional Application Ser. No. 60/184,848 filed Feb. 25, 2000. Said U.S. Provisional Application Ser. No. 60/184,848 is hereby incorporated by reference.

FIELD OF THE INVENTION

The present invention generally relates to content players and more particularly to a content player capable of broadcasting to information appliances.

BACKGROUND OF THE INVENTION

Media players are well known in the art taking the form of broadcast players and record players. Media players of both the broadcast type and the record type have been recently converged. Typical home-entertainment centers include audio and video broadcast receivers along with record players such as a video cassette recorder (VCR), compact disk player, digital video disk (DVD) player, a phonograph and the like. Also known to the art are dedicated WEB browsers which may be utilized to selectively address and display Internet content on a home-entertainment center. Such WEB browsers seek to converge some of the capabilities of the home computer with the home-entertainment center.

Also known to the art is the placement of radio and television broadcasts on the Internet. For example, a radio program from a radio station in New York may be listened to by a person who is in California if the radio program is placed upon the Internet. However, a typical listener of a radio program may wish to be performing various tasks while the program is being broadcast. For example, during a morning radio show, a person may be listening to the show while he or she is taking a shower, getting dressed, making breakfast and the like. This may not be possible if listening to a program which has been stored on the Internet because the person will have to be near a typical information handling system such as a personal computer which may be located in one location in a home.

Due to the cost and size of personal computers, it may not be feasible to have multiple computers located within a home. However, it would be advantageous if the content retrieved from the Internet and downloaded to a personal computer or content player could be transferred and rebroadcast to smaller, less costly information appliances located throughout a home and office.

Consequently, it would be advantageous to provide a content player capable retrieving content from a network and broadcasting the retrieved content to information appliances located throughout a home. If the media content received by the content player could be broadcast to information appliances around a home, consumers may enjoy media content in a number of places around a home instead of being required to enjoy the content at a place near or close to a content player. It would also be advantageous if control of the content being broadcast to information appliances from a content player could be provided to a user through the information appliance itself.

SUMMARY OF THE INVENTION

Accordingly, the present invention is directed to a content player that allows a user to access media content through an information appliance. Further, the present invention is directed to a content player that is capable of broadcasting to information appliances. For example, a broadcast placed on the Internet and accessed through the content player may be broadcasted to information appliances located throughout the home that are capable of conveying the media content and thus may be enjoyed by a user while performing other activities.

In an embodiment of the present invention, the content player may be in the form of an Internet radio receiver. The Internet radio receiver may be capable of retrieving radio broadcasts which have been placed on the Internet. An Internet radio receiver of the present invention may be capable of rebroadcasting the radio program retrieved off the Internet to information appliances via a hardwire or wireless transmission system.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
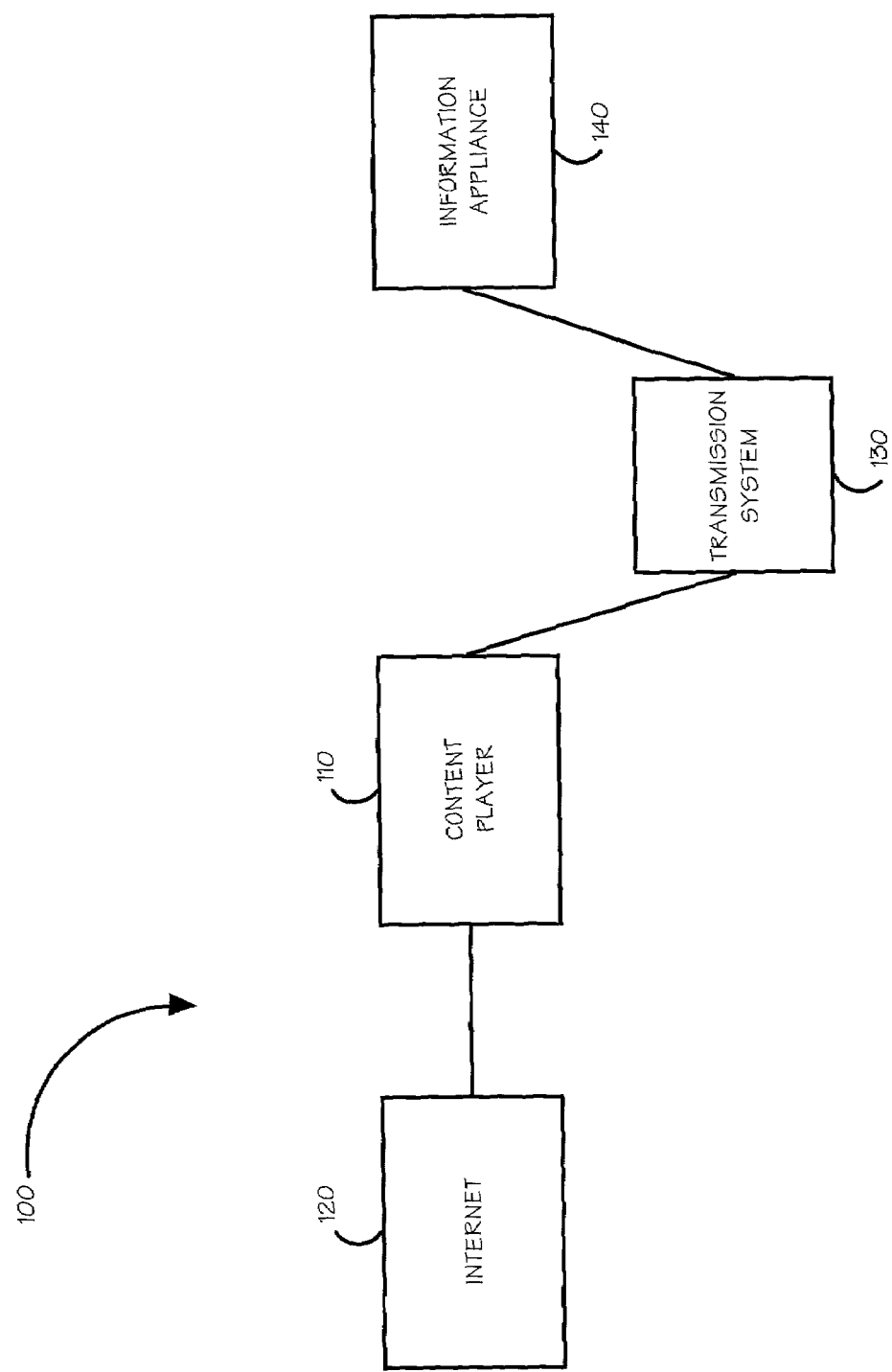
FIG. 1 is an exemplary block diagram of a system of the present invention.

Referring to FIG. 1, a block diagram representing an exemplary embodiment 100 of the present invention is shown. A content player 110 may be operably connected to a world wide network to access and retrieve content. An example of a world wide network may be the Internet 120. Various ways and methods of connecting a content player to a world wide network such as the Internet 120 exist including through digital subscriber line (DSL), integrated digital services network (ISDN), Dial-up, Cable Modem, and the like. The content player 110 may be operably connected to a transmission system 130. The transmission system 130 may be suitable for delivering media content that may be received by the content player 110 to various information appliances 140. In an alternative embodiment of the present invention, the transmission system 130 may be incorporated within content player 110 without departing from the scope and spirit of the present invention.

The transmission system may include hardwire and wireless transmission. In a hardwire embodiment of the transmission system, the content player and an information appliance may be connected with a cable capable of delivery of media content. Further, the cable may be able to transfer control signals from an information appliance to a content player for controlling the content player. In a wireless embodiment of a transmission system, a transmitter may be connected with a content player and with an information appliance. A transmitter may be connected with a content player and a transmitter may be connected with an information appliance to provide the capability of bi-directional transfer of data. This may allow receipt of media content by the information appliance from the content player. Further, control of the content player may be accomplished via an information appliance. Wireless connections may include radio-frequency and infrared technology. However, in a preferred embodiment the wireless connection would comprise a 2.4 Gigahertz frequency-hopping spread spectrum signal. Its also preferable that the information appliances are suitable for receiving media content delivered through a 2.4 Gigahertz frequency-hopping spread spectrum signal. The 2.4 Gigahertz frequency-hopping spread spectrum signal may be in accordance with the Bluetooth standard.

Figure 2:
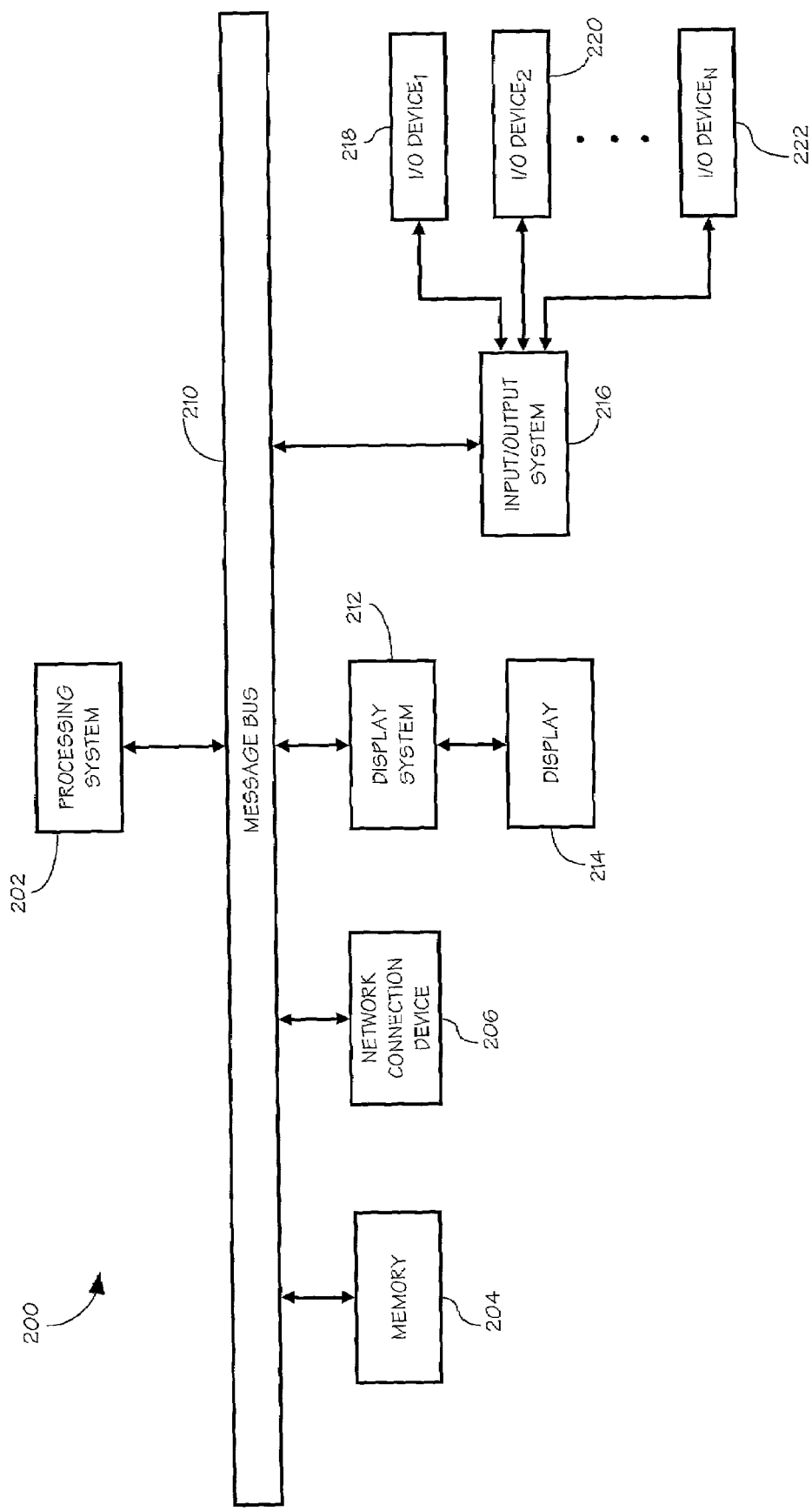
FIG. 2 is an exemplary block diagram of a content player of the present invention.

Referring now to FIG. 2, a hardware system in accordance with the present invention is shown. The hardware system shown in FIG. 2 is generally representative of the hardware architecture of a content player of the present invention. A controller, for example, a processing system 202, controls the content player 200. The processing system 202 includes a central processing unit such as a microprocessor or microcontroller for executing programs, performing data manipulations and controlling the tasks of the content player 200. Communication with the processing system 202 may be implemented through a system bus 220 for transferring information among the devices of the content player 200. The system bus 220 may include a data channel for facilitating information transfer between storage and other peripheral devices of the content player 200. The system bus 220 further provides the set of signals required for communication with processing system 202 including a data bus, address bus, and control bus. The system bus 210 may comprise any state of the art bus architecture according to promulgated standards, for example industry standard architecture (ISA), extended industry standard architecture (EISA), Micro Channel Architecture (MCA), peripheral device interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 210 may be compliant with any promulgated industry standard. For example, the system bus 210 may be designed in compliance with any of the following bus architectures: Industry Standard Architecture (ISA), Extended Industry Standard Architecture (EISA), Micro Channel Architecture, Peripheral Device Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), for example.

Additionally, the content player 200 includes a memory 204. In one embodiment, memory 204 is provided on SIMMs (Single In-line Memory Modules), while in another embodiment, memory 204 is provided on DIMMs (Dual In-line Memory Modules), each of which plugs into suitable sockets provided on a motherboard holding many of the other devices shown in FIG. 2. Memory 204 includes standard DRAM (Dynamic Random-Access Memory), EDO (Extended Data Out) DRAM, SDRAM (Synchronous DRAM), or other suitable memory technology. Memory 204 may also include auxiliary memory to provide storage of instructions and data that are loaded into the memory 204 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The content player 200 further includes a network interface 206. The network interface 206 communicates between the content player 200 and a remote device, such as external devices, networks, information sources, or host systems that administer a plurality of content players. For example, host systems such as a server or information handling system, may run software controlling the content player, serve as a storage for a content player, or coordinate software running separately on each content player. The network interface 206 may provide or receive analog, digital, or radio frequency data. The network interface system 206 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network interface system 206 may comprise a network adapter, a serial port, parallel port, printer adapter, modem, universal asynchronous receiver-transmitter (UART) port, etc., or use various wireless technologies or links such as an infrared port, radio-frequency (RF) communications adapter, infrared transducers, or RF modem.

The content player 200 further includes a display system 212 for connecting to a display device 214. The display system 212 may comprise a video display adapter having all of the devices for driving the display device, including video random access memory (VRAM), buffer, and graphics engine as desired. The display device 214 may comprise a liquid-crystal display (LCD), or may comprise alternative type of display technologies, such as a light-emitting diode (LED) display, gas or plasma display, or employ flat-screen technology.

A content player 200 may further include an input/output (I/O) system 216 for connecting to one or more I/O devices 218, 220, and up to N number of I/O devices 222. Input/output system 216 may comprise one or more controllers or adapters for providing interface functions between one or more of I/O devices 218–222. For example, input/output system 216 may comprise a serial port, parallel port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. It should be appreciated that modification or reconfiguration of the content player 200 of FIG. 2 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 204 of one or more content players configured generally as described in FIG. 2. Until required by the content player, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Figure 3:
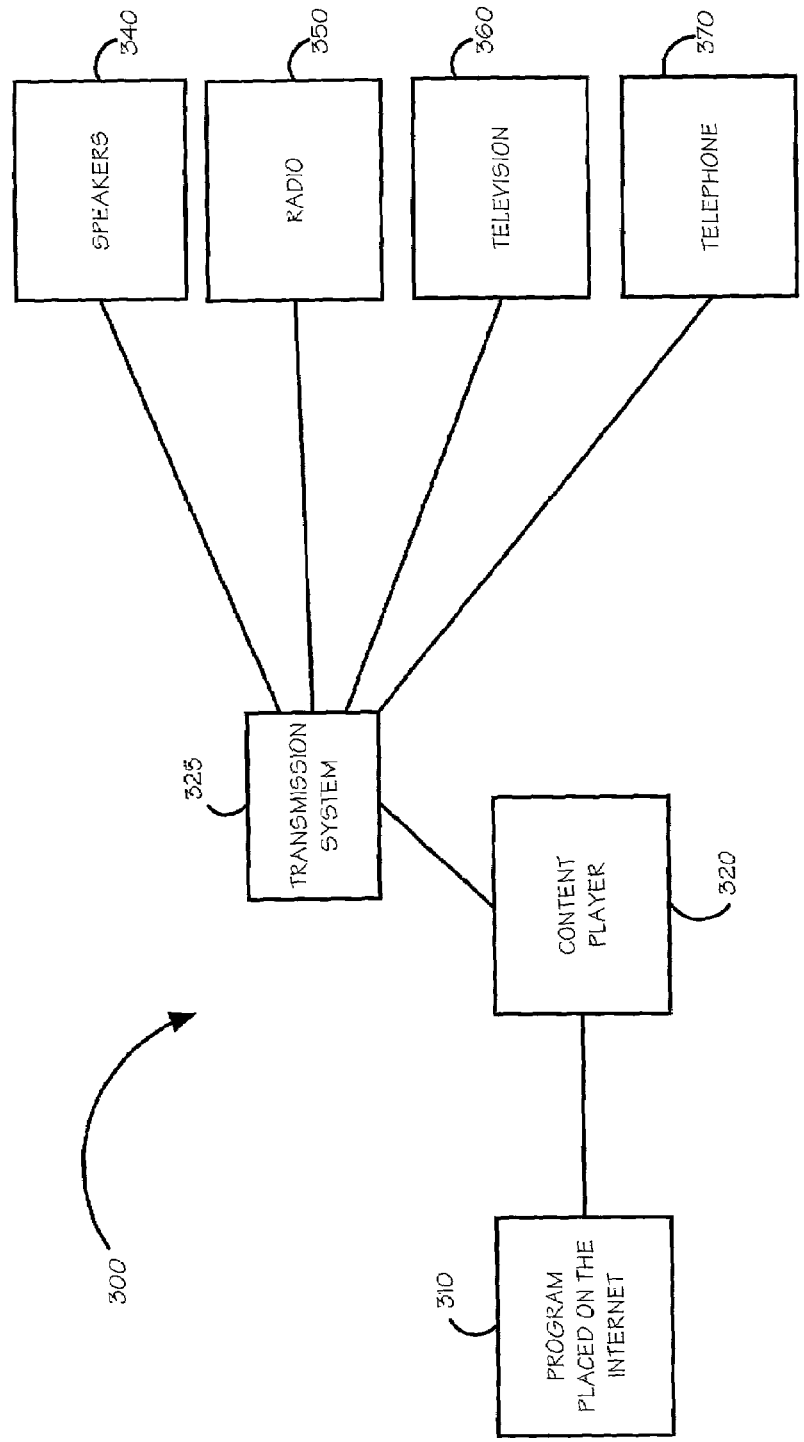
FIG. 3 depicts exemplary informational appliances of the present invention.

Referring to FIG. 3, several types of informational appliances 300 which may be utilized with the present invention are shown. All of the devices shown in FIG. 3 preferably are capable of receiving media content from a content player by a transmission system and conveying the media content. Examples of devices which may be utilized as informational appliances may be speakers 340, radio 350, television 360, and a telephone 370. It should be understood that the devices shown in FIG. 3 is not exclusive and other devices may be utilized without departing from the scope and spirit of the present invention.

Figure 4:
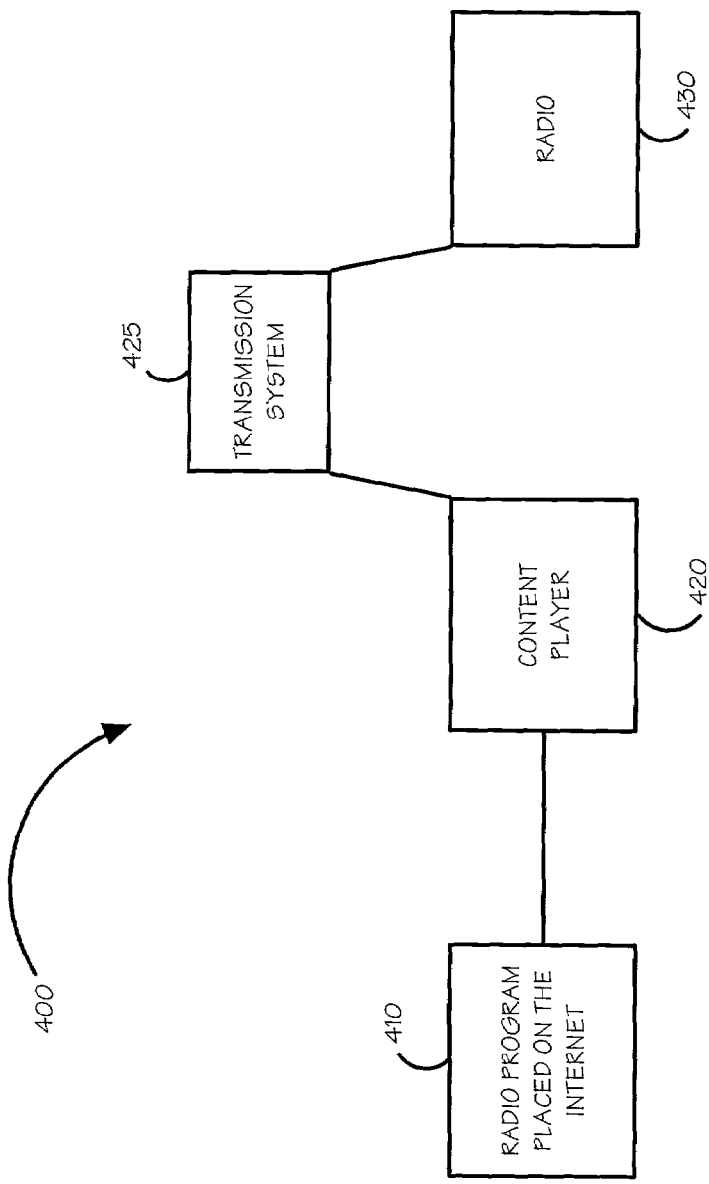
FIG. 4 depicts an exemplary use of the present invention.

Referring now to FIG. 4, an example of an exemplary embodiment 200 of the present invention is disclosed. Suppose that a radio program 410 has been placed on the Internet. A content player 420 may be suitable for receiving and playing the content of the radio program. However, a consumer may not wish to be forced to stay around the content player in order to enjoy the program. Thus, the content player may broadcast the program to various information appliances throughout the consumer's home.

In an embodiment of the present invention, a content player may be in the form of an Internet radio receiver. The Internet radio receiver may be capable of retrieving radio broadcasts placed upon the Internet. An advantageous aspect of the Internet radio receiver of the present invention may be the ability to rebroadcast the retrieved radio broadcasts to information appliances.

As an example, radios 430 located within the home may be able to receive the broadcast from the content player and deliver the content. The present invention is not limited to the broadcast of radio programs and other types of media content may be delivered and conveyed through information appliances without departing from the scope and spirit of the present invention.

An advantageous aspect of the present invention is the ability to control a content player of the present invention through an information appliance. For example, it may be cumbersome to make and initiate a desired selection of media content through controls provided by the content player. A content player may be placed upon a main floor of a home while a radio is placed in a location on the second floor of the home. A user may be capable of controlling a content player of the present invention utilizing the existing controls of an information appliance. Utilizing a radio as an example of an information appliance, if the radio is tuned to a certain frequency then the radio may receive a broadcast from the content player. Further, each time the radio is tuned to a particular frequency, it may alert the content player to broadcast a particular program. As a result, a user may initiate a broadcast of a particular program by tuning a particular frequency on a radio.

Another advantageous aspect is the ability to limit the wireless broadcast of content from a content player to a specified region, within a house for example. Consumers may not desire others being capable of eavesdropping upon the transmission of content. Therefore, the content player of the present invention may be incorporated with a wireless transmission system capable of automatic power adaption. Automatic power adaption may allow one to adjust the range of the broadcast to a predefined area such that within a home an information appliance may be capable of receiving the broadcast. However, an information appliance located outside of the home may not be capable of receiving the broadcast. Further, the wireless transmission may be encrypted while employing a frequency-hopping scheme to further ensure secure transmission.

As not all information appliances may be capable of supporting all types of media content, it may be advantageous if the content player of the present invention could format the content such that the desired information appliance could support the content. For example, speakers may not be capable of supporting video content. However, the content player may be capable of parsing the audio content from the original broadcast to provide the audio from the original video broadcast. In this way, a user may be capable of listening to the broadcast through the speakers.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A content broadcaster, comprising:

a personal computer configured to access and receive media content from a world wide network and configured to playback the media content, the media content including at least one of audio data and video data, the personal computer including a controller, a memory, a network connection device, a display system, and an input/output system, the controller configured to communicate with the memory, the network connection device, the display system, and the input/output system with a system bus;

a plurality of information appliances, each information appliance configured to communicate with the personal computer with a bi-directional communication link between the information appliance and the input/output system of the personal computer;

where personal computer is configured to broadcast the media content to the information appliance using the bi-directional communication link;

where the information appliance is configured to transmit control signals to the personal computer using the bi-directional communication link, the control signals configured to command the controller to broadcast a specified portion of the media content to the plurality of information appliances;

where each of the information appliances is located in a different room;

wherein the bi-directional communication link comprises a wireless transmission system; and wherein the information appliance comprises a radio capable of receiving a frequency-hopping spread spectrum signal transmitted by the personal computer over the bi-directional communication link.

2. The content broadcaster of claim 1, wherein the bi-directional communication link comprises a cable.

3. The content broadcaster of claim 1, wherein the personal computer comprises an Internet radio receiver.

4. The content broadcaster of claim 1, wherein the radio is capable of wirelessly receiving a radio broadcast over a uni-directional communication link between the radio and a radio broadcast source other than the personal computer.

5. The content broadcaster of claim 1, wherein the specified portion of the media content consists of the audio data.

6. The content broadcaster of claim 1,
wherein each informational appliance is configured to provide control signals that signal the personal computer to broadcast particular media content.

7. The content broadcaster of claim 6
wherein at least one of the information appliances is an internet radio including a tuning selector;
wherein the at least one of the information appliances is configured to transmit a control signal to the personal computer that indicate the particular media content responsive to the tuning selector; and
wherein the personal computer is configured to transmit the particular media content to the at least one and other informational appliances responsive to the control signal.

8. A method of broadcasting media content to an information appliance from a personal computer that is linked to a network, the personal computer in communication with the information appliance by a bi-directional communication link between the personal computer and the information appliance, the personal computer configured to playback the media content, the media content including at least two programs, the method comprising:

locating the personal computer in one room;

locating the information appliance in another room distinct from the one room;

using the personal computer to receive the media content from the network;

storing the media content in a memory that is included in the personal computer;

transmitting control signals from the information appliance in the another room to the personal computer in the one room over the bi-directional communication link, the control signals indicative of a selected one of the at least two programs;

broadcasting the selected one of the at least two programs from the personal computer to the information appliance over the bi-directional communication link in response to the control signals, the information appliance configured to receive and playback the selected one of the at least two programs;

configuring the personal computer to playback the media content;

transmitting the control signals and the selected one of the at least two programs over a wireless communication link; and transmitting the selected one of the at least two programs from the personal computer in the one room to a radio in the another room over the wireless communication link using a frequency-hopping spread spectrum signal.

9. The method of claim 8, wherein transmitting the control signals and the selected one of the at least two programs over the bi-directional communication link comprises transmitting the control signals and the selected one of the at least two programs over a cable.

10. The method of claim 8, wherein transmitting the control signals from the information appliance to the personal computer comprises:
tuning the radio to a particular frequency; and
transmitting the control signals from the radio to the in response to tuning the radio to the particular frequency.

11. The method of claim 10, further comprising, after tuning the radio to the particular frequency, broadcasting the selected one the at least two programs from the beginning of the selected one of the at least two programs from the personal computer in the one room to the information appliance in the another room responsive to the control signals transmitted, in turn, in response to the tuning.

* * * * *